United States Patent
Plote et al.

(10) Patent No.: US 6,952,953 B2
(45) Date of Patent: Oct. 11, 2005

(54) METHOD AND DEVICE FOR MONITORING A SENSOR

(75) Inventors: Holger Plote, Ennsdorf (AT); Andreas Krautter, Steinheim (DE); Michael Walter, Kornwestheim (DE); Juergen Sojka, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/471,903

(22) PCT Filed: Feb. 26, 2002

(86) PCT No.: PCT/DE02/00705
§ 371 (c)(1),
(2), (4) Date: Feb. 23, 2004

(87) PCT Pub. No.: WO02/073146
PCT Pub. Date: Sep. 19, 2002

(65) Prior Publication Data
US 2004/0129065 A1 Jul. 8, 2004

(30) Foreign Application Priority Data
Mar. 14, 2001 (DE) .......................... 101 12 139

(51) Int. Cl.⁷ ............................................. G01M 15/00
(52) U.S. Cl. .................................................. 73/119 R
(58) Field of Search ........................... 73/23.31, 23.32, 73/116, 117.2, 117.3, 118.1, 119 R

(56) References Cited

U.S. PATENT DOCUMENTS

| 6,065,446 A | * | 5/2000 | Engl et al. ................... 123/325 |
| 6,145,490 A | * | 11/2000 | Heidenfelder et al. ...... 123/295 |
| 6,708,661 B1 | * | 3/2004 | Aubourg et al. ........ 123/179.16 |
| 6,796,293 B2 | * | 9/2004 | Bayerle et al. .............. 123/491 |
| 2003/0051538 A1 | * | 3/2003 | Hashiguchi ................ 73/117.3 |

FOREIGN PATENT DOCUMENTS

| DE | 199 06 287 | 8/2000 |
| FR | 2 712 695 | 5/1995 |

* cited by examiner

Primary Examiner—Eric S. McCall
(74) Attorney, Agent, or Firm—Kenyon & Kenyon

(57) ABSTRACT

A device and a method for monitoring a sensor for an exhaust-gas after-treatment system, in particular a temperature sensor. In specified operating states, a first signal from the first sensor to be monitored may be compared to a second signal from a second sensor. Errors may be detected when at least the two signals differ from one another by more than a value.

7 Claims, 2 Drawing Sheets

METHOD AND DEVICE FOR MONITORING A SENSOR

FIELD OF THE INVENTION

The present invention relates to a method and a device for monitoring a sensor.

BACKGROUND INFORMATION

A method and a device for controlling an internal combustion engine having an exhaust-gas after-treatment system is discussed in German Patent Application No. 199 06 287. In the system described therein, a particle filter may be used which filters out particles contained in the exhaust gas. In order to accurately control the internal combustion engine and the exhaust-gas after-treatment system, the state of the exhaust-gas after-treatment system may need to be known. Sensors, among other devices, may be used to determine the state of the exhaust-gas after-treatment system. Sensors may be used in particular to provide the temperature values which characterize the temperature upstream from, downstream from, and/or in the exhaust-gas after-treatment system.

SUMMARY

A method of monitoring a sensor for an exhaust-gas after-treatment system, in particular a temperature sensor, is described. It may be possible to easily and accurately monitor sensors for an exhaust-gas after-treatment system by comparing, in specified operating states, a first signal from a first sensor to be monitored to a second signal from a second sensor, and detecting errors when at least the two signals differ from one another by more than a predeterminable value. Temperature sensors may preferably be monitored using the method. However, the method may also be used for other sensors which are used for controlling the exhaust-gas after-treatment system. This may possibly apply to sensors for detecting the state of the exhaust-gas after-treatment system, and/or for pressure, temperature, and/or air flow sensors.

The use of the method for temperature sensors may be particularly advantageous. In particular, the first signal may characterize the temperature of the exhaust gases upstream from an exhaust-gas after-treatment system, in an exhaust-gas after-treatment system, and/or downstream from an exhaust-gas after-treatment system. The detection of these temperature variables may be particularly sensitive, since controlling the exhaust-gas after-treatment system requires that these variables be detected with high accuracy.

It may be particularly advantageous if these signals are compared to a second signal which characterizes the temperature of the gases fed to the internal combustion engine, to the oxidation catalyst, or to the particle filter. These signals may be suitable in particular, since in specified operating states, this comparison signal may take on substantially the same values as the signals to be monitored.

It may be particularly advantageous to monitor in operating states for which the cooling water temperature and/or the temperature of the gases fed to the internal combustion engine and/or the difference between the two temperatures is less than a threshold value. In these operating states, the difference between the signals to be monitored and the comparison signals maybe at a minimum.

DETAILED DESCRIPTION

Figure 1:
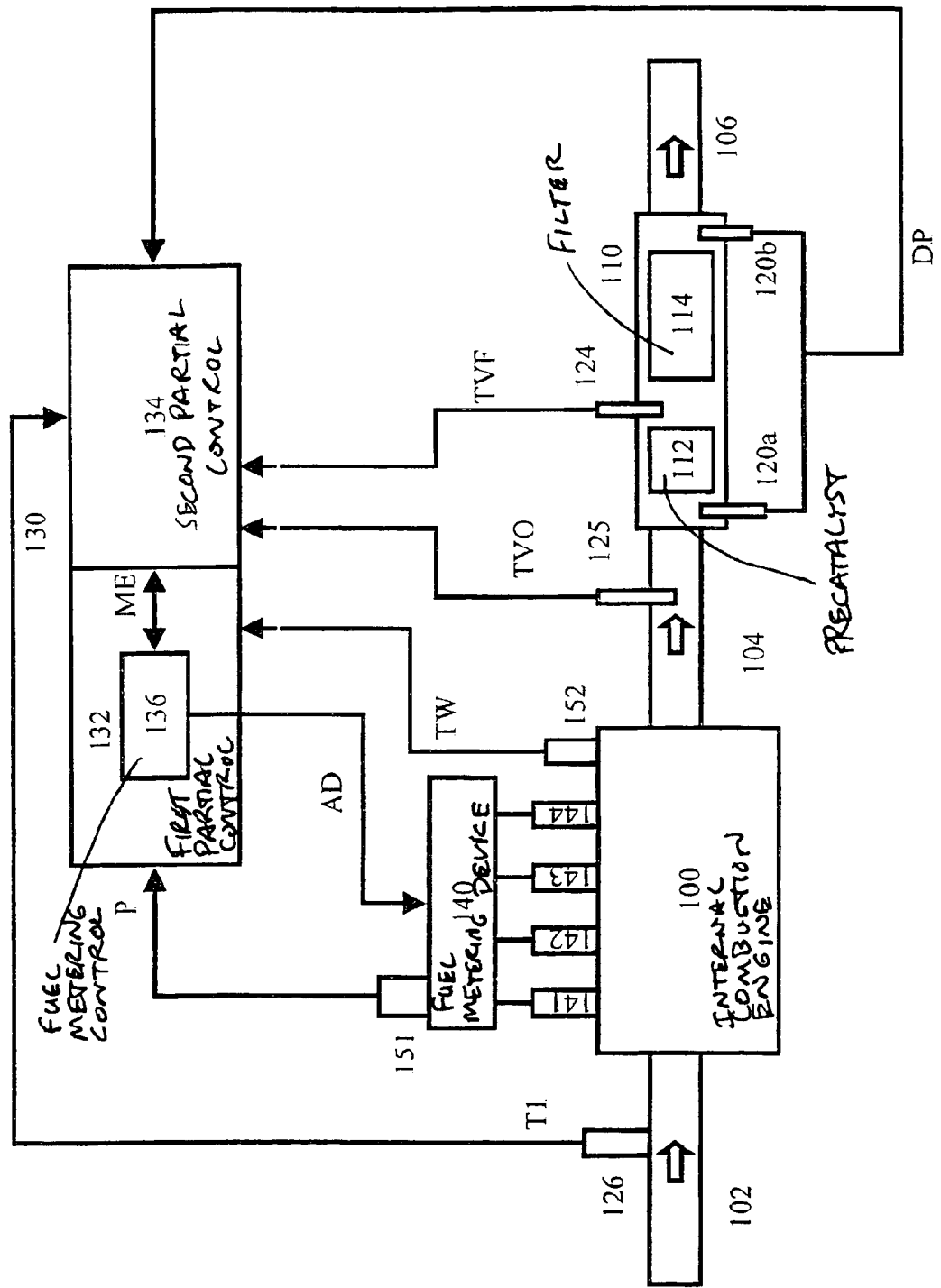
FIG. 1 shows a block diagram of the device according to an exemplary embodiment of the present invention.

The device according to an exemplary embodiment of the present invention is described below using an auto-ignition internal combustion engine as an example, in which the fuel metering is controlled by a common rail system. However, the exemplary method according to the present invention is not limited to these systems, and may be used in other internal combustion engines as well.

An internal combustion engine designated by reference number 100 receives fresh air supplied via an intake line 102 and discharges exhaust gases via an exhaust line 104. An exhaust-gas after-treatment arrangement 110 is situated in exhaust line 104 from where the purified exhaust gases are released to the atmosphere via line 106. Exhaust-gas after-treatment arrangement 110 may include a precatalyst 112 and a filter 114 downstream therefrom. A temperature sensor 124 may preferably be situated between precatalyst 112 and filter 114 which may provide a temperature signal TVF. Sensors 120a and 120b may be respectively provided upstream from precatalyst 112 and downstream from filter 114. These sensors may act as differential pressure sensors 120 and may provide a differential pressure signal DP which may characterize the differential pressure between the inlet and the outlet of the exhaust-gas after-treatment arrangement. In addition, a sensor 126 maybe situated in intake line 102 which detects a signal T1 which may characterize temperature T1 of the fresh air supplied. A sensor 125 may transmit a signal TVO which may characterize the temperature upstream from exhaust-gas after-treatment system 110.

Fuel may be metered to internal combustion engine 100 via a fuel metering device 140. The fuel metering device may meter fuel to the individual cylinders of internal combustion engine 100 via injectors 141, 142, 143, and 144. The fuel metering device may be, for example, a common rail system. A high-pressure pump may convey fuel to an accumulator. From the accumulator the fuel enters the internal combustion engine via the injectors.

Various sensors 151 may be situated on fuel metering device 140 which may provide signals that characterize the state of the fuel metering device. For a common rail system, for example, this may involve pressure P in the accumulator. Sensors 152 may be situated on internal combustion engine 100 which characterize the state of the internal combustion engine. This may involve, for example, a temperature sensor which provides a signal TW that characterizes the engine temperature.

The output signals from these sensors reach a control 130, which is illustrated as a first partial control 132 and a second partial control 134. The two partial controls may form, for example, a structural unit. First partial control 132 may actuate, for example, fuel metering device 140 with actuating signals AD which influence the fuel metering. To this end, first partial control 132 contains a fuel metering control 136. The fuel metering control transmits a signal ME, which may characterize the quantity to be injected, to second partial control 134.

Second partial control 134 may, for example, control the exhaust-gas after-treatment system, and to this end may detect the corresponding sensor signals. In addition, second partial control 134 may exchange signals, in particular regarding quantity of fuel ME injected, with first partial control 132. The two controls may possibly make mutual use of the sensor signals and the internal signals.

The first partial control, also referred to as engine control 132, controls actuating signal AD for actuating fuel metering device 140 as a function of various signals which may characterize the operating state of internal combustion engine 100, the state of fuel metering device 140, and the ambient conditions, in addition to a signal which may characterize the desired power and/or torque from the internal combustion engine. Such devices are conventional, and are used in a variety of ways.

Particle emissions may appear in the exhaust gas, in particular with diesel engines. To this end, exhaust-gas after-treatment arrangement 110 filters these particles from the exhaust gas. Particles accumulate in filter 114 as a result of this filtering process. To clean the filter, these particles are then combusted in specified operating states, load states, and/or after specified times or counter positions have passed for the quantity of fuel or the distance traveled. Filter 114 is usually regenerated by increasing the temperature in exhaust-gas after-treatment arrangement 110 until the particles combust.

Precatalyst 112 is provided for raising the temperature. The temperature is raised by, for example, increasing the proportion of uncombusted hydrocarbons in the exhaust gas. These uncombusted hydrocarbons then react in precatalyst 112 and raise the temperature of the precatalyst and that of the exhaust gas.

This temperature increase in the precatalyst and the exhaust gas may require an increase in fuel consumption, and therefore should be carried out only when necessary, i.e., when filter 114 is loaded with a certain amount of particles. One possibility for determining the load state is to determine differential pressure DP between the input and the output of the exhaust-gas after-treatment arrangement, and/or to make a calculation and, based on this value, to determine the load state.

The demands on the efficiency and the availability of the individual components may be very high. The sensors used, in particular the temperature sensors which may be indispensable for proper control of the exhaust-gas after-treatment system, may play a key role in controlling the exhaust-gas after-treatment system. It may not be sufficient to test the sensors as part of maintenance or during a technical check for sensor operability. This may be particularly relevant with regard to regulatory requirements for on-board diagnosis of emissions-related systems.

A defect in a sensor may need to be detected early to prevent exceedance of the allowable emissions and to ensure the operability of the exhaust-gas after-treatment system. The method described below may allow a simple check, in particular of the temperature sensors in the exhaust gas train, thereby ensuring the operability of the exhaust-gas after-treatment system. In this manner, a failure and/or unacceptable drift of the sensors may be detected early.

An example method according to the present invention is described below, using temperature sensors as an example. In principle, this method may also be used for other sensors, in particular for sensors in the exhaust gas train. The method according to the present invention may be used to check all sensors downstream from the internal combustion engine, i.e., between the internal combustion engine and the exhaust-gas after-treatment system, sensors in the exhaust gas treatment, i.e., between the oxidation catalyst and the particle filter, and/or sensors downstream from the particle filter. The example method according to the present invention may also be used for other systems of catalysts and/or particle filters.

According to an example embodiment of the present invention, malfunctioning of the temperature sensor in the exhaust gas train may be detected by determining the plausibility of individual signals when a cold engine is started. In this situation, it may be assumed that all temperature signals are within the range of the ambient temperature. All necessary signals and data are already present in the control unit, so that no additional sensors may be required.

Figure 2:
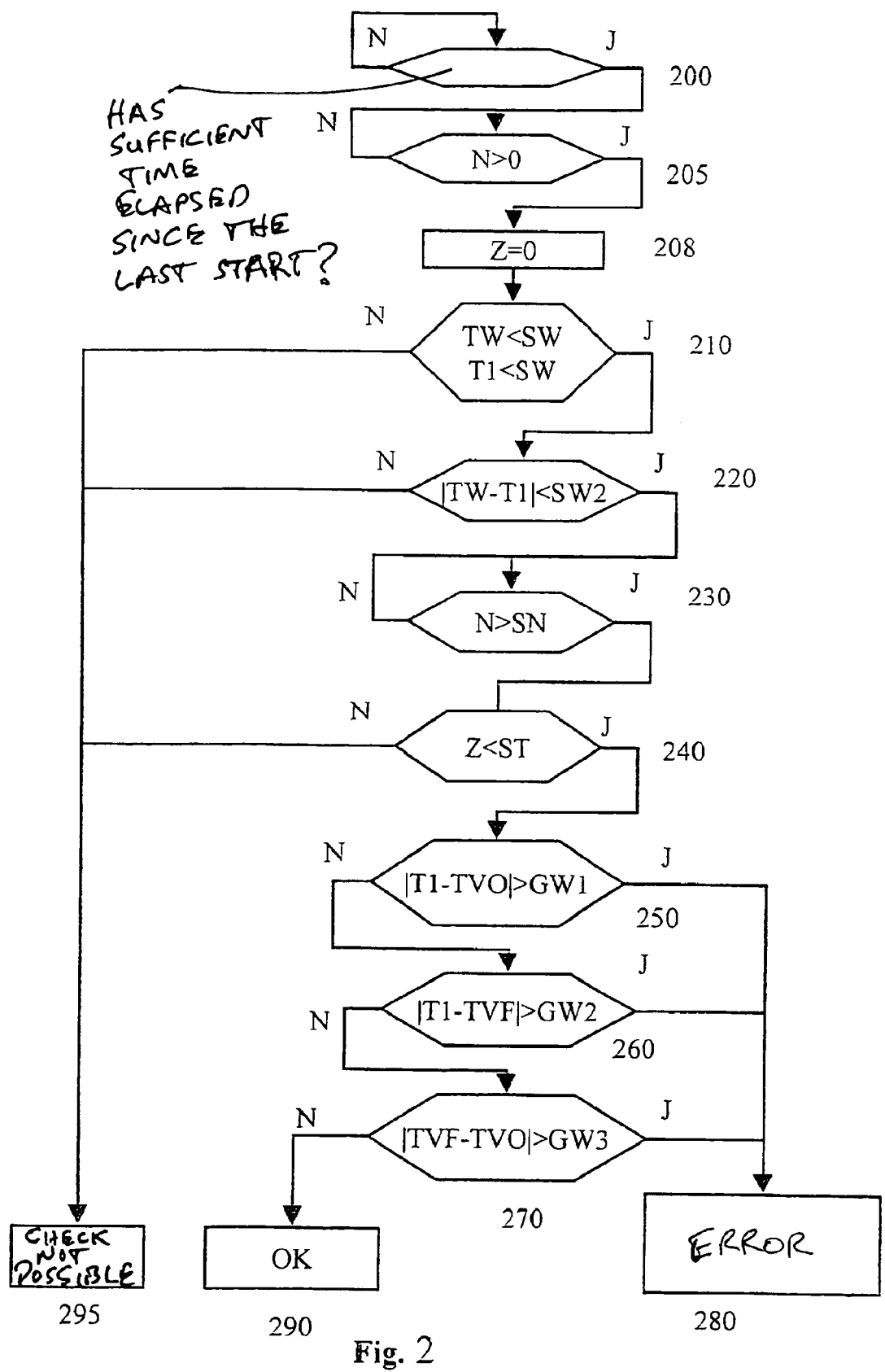
FIG. 2 shows a flow chart illustrating the method according to an exemplary embodiment of the present invention.

FIG. 2 illustrates as a flow chart one example embodiment of a method according to the present invention. A first query 200 checks whether sufficient time has elapsed since the last start. A second query 205 checks whether the internal combustion engine has begun to turn. Query 205 may check, for example, whether speed N is greater than 0. If this is not the case, step 205 is repeated. If the internal combustion engine is turning, a time counter Z is started in step 208, and a query 210 checks whether various temperature signals, such as cooling water temperature TW, and/or temperature T1 of fresh air drawn in, and/or the ambient temperature which is an approximation of temperature T1, are less than a threshold value SW. If this is not the case, i.e., if one of the temperatures is greater than the threshold value, it may be determined in step 295 that a check is not possible. If the temperatures are less than the threshold value, query 220 follows. In one simplified embodiment, it may also be provided that only one of the temperature values is checked.

Query 220 checks whether the absolute value of the difference between these two temperature values is less than a threshold value SW2. It this is not the case, i.e., if the cooling water temperature and the ambient air temperature differ from one another significantly, it is likewise determined that no check is possible. If the two temperature values are approximately equal, query 230 follows.

Query 230 checks whether speed N is greater than a threshold value SN. If this is not the case, step 230 is repeated. If query 230 determines that the starting cutout speed has been reached, query 240 follows. This query 240 checks whether time Z elapsed since the first turning of the internal combustion engine is less than a threshold value ST. If this is not the case, it is likewise determined that no check is possible. If the time elapsed since the first turning of the internal combustion engine is less than a threshold value, step 250 is followed by the actual checking of the temperature sensors.

A first query 250 checks whether the absolute value of the difference between fresh air temperature T1 and temperature TVO upstream from the exhaust-gas after-treatment system is greater than a threshold value GW2. If this is the case, errors are likewise detected in step 280. If this is not the case, a check is made as to whether the absolute value of the difference between ambient temperature T1 and temperature TVF in the exhaust-gas after-treatment system is greater than a threshold value GW2. If this is the case, errors are likewise detected in step 280. If this is not the case, query 270 checks whether the absolute value of the difference between temperature signal TVO for the temperature upstream from the exhaust-gas after-treatment system and temperature TVF in the exhaust-gas after-treatment system is greater than a threshold value GW3. If this is the case, an error is likewise detected in step 280. If this is not the case, it is determined in step 290 that no error is present and the sensors are operating properly.

The described example method illustrates the monitoring using the example of a temperature sensor 125 upstream from the exhaust-gas after-treatment system and a temperature sensor 124 in the exhaust-gas after-treatment system which is situated between an oxidation catalyst and a particle filter. The described example method is not limited to this specialized system of sensors. The method may also be used for other systems of sensors and/or catalysts and filters. In particular for the use of an $NO_x$ storage catalyst, it may be possible to replace a temperature sensor, in particular temperature sensor 125, by a sensor upstream from the $NO_x$ storage catalyst.

Furthermore, additional sensors may be situated in the exhaust-gas after-treatment system, these sensors then being checked against the ambient temperature as well as with respect to one another for plausibility. In addition, in one simplified embodiment, it may also be possible to provide only one sensor in the exhaust-gas after-treatment system, and this sensor may be checked against the ambient air temperature for plausibility.

A check may possibly be made only with a cold start. That is, the check may be made only if the engine has not been operated for a fairly long time. To this end, a check may be made as to whether sufficient time has elapsed since the last start-up. This is determined by query 200. In this case a check may be prevented, since the temperatures in the exhaust gas system have already been modified to the extent that an error was erroneously determined.

In addition, a check may be made as to whether cooling water temperature TW and/or intake air temperature T1 and/or their difference is below a limit value SW.

In addition, plausibility checking may not be performed until starting cutout speed SN is exceeded and the internal combustion engine is in normal operation. This may be ensured by query 230.

At this point the measured temperatures may have been changed only insignificantly, which is attributed to sensor lag, among other factors. If the start-up takes too long, it may no longer be possible to make this assurance. Therefore, a check may be made in query 240 as to whether the starting cutout speed has been reached within a predeterminable maximum time.

Plausibility checking may preferably be performed only when all checks have been carried out. For simplified exemplary embodiments, it may also be provided that one or the other query is not performed. The temperature differences between the temperature sensors to be monitored and the intake air temperature, and the difference between the temperature signals to be individually monitored, may constitute the above-referenced prerequisites. In the exemplary embodiment illustrated, the temperature sensors upstream from the catalyst and upstream from the filter may be monitored. If the absolute values of the differences are greater than a limiting value, an error may be detected. An error-free state is determined when all temperature sensors indicate the value of a reference sensor. Instead of the intake air temperature, the ambient air temperature may be used as the reference sensor.

What is claimed is:

1. A method of monitoring a sensor situated in an exhaust-gas after-treatment system of an internal combustion engine, comprising:

checking specified operating states of the internal combustion engine are present, the checking including determining whether at least one of a cooling water temperature, an intake air temperature of the internal combustion engine, and a difference between the cooling water temperature and the intake air temperature is less than a first threshold value, and the checking including determining whether a speed of the internal combustion engine is greater than a starting cutout speed;

if the specified operating states are present, comparing a first signal from the sensor to a second signal from a second sensor; and detecting an error when a difference between the first signal and the second signal exceeds a second threshold value.

2. The method of claim 1, wherein the first signal from the sensor is a temperature signal.

3. The method of claim 2, wherein the first signal from the sensor represents a temperature one of upstream from a catalyst or upstream from a particle filter.

4. The method of claim 2, wherein the second signal from the second sensor represents one of the intake air temperature, a temperature upstream from a catalyst or a temperature upstream from a particle filter.

5. The method of claim 1, wherein the checking step further includes determining whether a time elapsed since a last start-up of the internal combustion engine is greater than a further threshold value.

6. The method of claim 1, wherein the checking step further includes determining whether a duration of a start-up of the internal combustion engine is less than an additional threshold value.

7. A device adapted to monitor a sensor situated in an exhaust-gas after-treatment system of an internal combustion engine, comprising:

a first arrangement configured to check whether specified operating states of the internal combustion engine are present, the checking including determining whether at least one of a cooling water temperature, an intake air temperature of the internal combustion engine, and a difference between the cooling water temperature and the intake air temperature is less than a first threshold value, and the checking including determining whether a speed of the internal combustion engine is greater than a starting cutout speed;

a second arrangement configured to compare a first signal from the sensor to a second signal from a second sensor if the specified operating states are present; and a third arrangement configured to detect an error when a difference between the first signal and the second signal exceeds a second threshold value.

* * * * *